INVENTORS
Moroni Taylor Abegg
William B. Leslie
BY

Attorney

INVENTORS
Moroni Taylor Abegg
William B. Leslie

United States Patent Office 3,342,540
Patented Sept. 19, 1967

3,342,540
ANTIFLASH DEVICE
Moroni Taylor Abegg and William B. Leslie, Albuquerque, N. Mex., assignors, by mesne assignments, to the United States of America as represented by the United States Atomic Energy Commission
Filed Mar. 8, 1962, Ser. No. 179,519
7 Claims. (Cl. 350—267)

The present invention relates generally to means for minimizing the effects of light emission and more particularly to a device capable of protecting the eyesight of personnel subjected to instantaneous and intense light emissions.

The human eye is a relatively delicate organ and when exposed to intense light it may be damaged or impaired to such an extent that the eyesight suffers varying degrees of flashblindness. In many instances the peak intensity of light emission is reached before adequate precautions to shield the eyes can be taken and normally the only shielding immediately available is to close the eyes, which requires excessive time. This problem of protecting eyesight from light or flash damage has for some time been present without a suitable solution. This is particularly true in the area of nuclear detonations where the flash intensity due to the emission of visible and near visible electromagnetic radiation reaches its peak in a fraction of a millisecond and may inflict damage to the eyesight ranging from temporary flashblindness to permanent chorioid-retinal burns.

Normally personnel such as pilots, aircrewmen, tank crews, etc., having duties in an environment with potential nuclear explosion possibilities may be forewarned a sufficient time before an explosion takes place to provide adequate eyesight protection. However, in the event an unexpected nuclear detonation takes place, such personnel do not have sufficient time to provide adequate cover for their eyes and may thus have their eyesight damaged. Many prior art teachings are directed to devices for protecting the eyesight from intense light flashes but each of these devices fails for one reason or another to provide an adequate solution to the problem. For example, one prior art device may be capable of providing adequate eye shielding but either the speed of attaining such shielding is far too slow or the complexity and size of the device makes it unsuitable for its intended use, or, on the other hand, another device may be of a suitable size and yet fail because the shielding is inadequate at the end of a certain time period after which eye damage may result. It is therefore a principal object of the present invention to provide a relatively simple and inexpensive eye shielding device capable of attaining a suitable optical density within a preselected maximum time period.

Another object of the present invention is to provide a curtain or cover of opaquing material within a lens-cell arrangement.

Another object of the present invention is to provide a goggle arrangement in which a pair of transparent members or "lenses" form an optical aperture adapted to be closed by explosive actuated opaquing material.

A further object of the present invention is to provide an opaquing material comprising a dispersion of opaque particles in a liquid carrier and which is contained in a reservoir adjacent a peripheral portion of a lens-cell arrangement.

A still further object of the present invention is to provide a length of mild detonating fuse or fuse material in close proximity to a source of opaquing material for dispersing the latter.

A still further object of the present invention is to provide a plurality of separate explosive means each operatively associated with a source of opaquing material.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention and a modification thereof have been chosen for purposes of illustration and description. The preferred embodiment and the modification illustrated are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

Described generally the present invention comprises a pair of transparent members or lenses which are separated from each other by suitable spacing means for providing an opaque material receiving chamber, space or void therebetween. Adjacent one end of the lenses, preferably adjacent the longest end or side portion of the lenses, is an elongate portion or member which may serve as a portion of the lens spacing means and be provided with reservoir means facing the void. An opaquing material, such as a suspension of carbon particles in a liquid carrier, and suitable explosive means are adapted to be operatively associated with the reservoir means. Thus, when intense light emission in the form of a flash occurs, a suitable light sensing means actuates the explosive means which very rapidly disperses the opaquing material throughout the chamber to effectively protect the eyesight of a wearer from the eye-damaging rays of the intense light.

For convenience of description the lens shapes in FIGS. 1–4 are shown and will be hereinafter referred to as being generally rectangular in shape, but it is to be understood that the lenses may be of any desired shape such as square, round, oval, etc. The term "lens" as used herein is not limited to a transparent substance having at least one curved, i.e., concave or convex, surface, but also includes a transparent substance without such curved surfaces.

Figure 1:
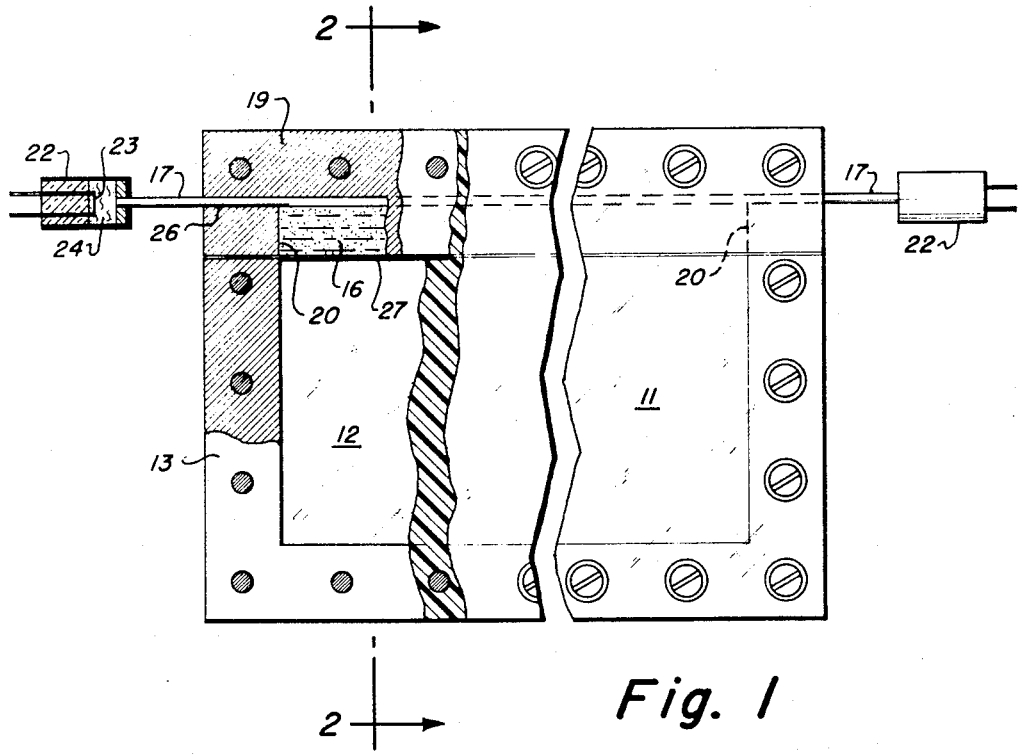
FIG. 1 is a schematic elevational view, partly cut away, showing the arrangement of the explosive and opaquing material of a preferred embodiment of the present invention.
Figure 2:
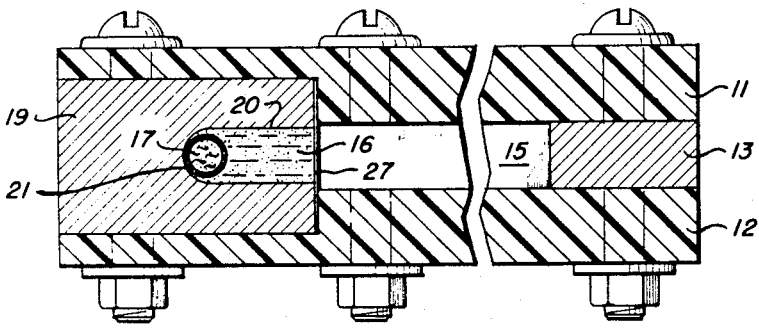
FIG. 2 is a sectional view taken along line 2—2 of FIG. 1.

Referring now to FIGS. 1 and 2 a preferred embodiment of the present invention is shown which may comprise a pair of rectangularly shaped transparent lenses 11 and 12 adapted to be spaced apart from each other by a generally U-shaped spacer 13 so as to form a two-window cell with an intermediate chamber or void 15. Each of these lenses may be made of a suitable optical material, such as the plastic Lexan (polycarbonate), cellulose acetate-butyrate, cellulose triacetate, or the like, which possesses high impact, tensile, and flexural strength and permits an initial light transmission of about seventy percent of the incident light through both lenses of the two-window cell. Normally about four percent of the incident light is reflected from each surface of optical grade plastic. This means about sixteen percent over-all reduction in light transmission for a two-cell window. However, if increased light transmission is desired, a suitable commercially available anti-reflection coating, such as, for example, magnesium fluoride, may be applied to each surface of the lens to reduce the four percent light loss to about one-half of one percent.

The portion or spacer 13, which may be made of any suitable plastic or metal, or a combination of metal and plastic, may be positioned intermediate the lenses 11 and 12 adjacent the outer or peripheral edges thereof so as to enclose substantially three sides of the chamber 15. The spacer 13 may then be bonded, bolted or otherwise secured, preferably in a substantially air-tight fashion, to the lenses to hold the latter in their proper space relationship and to structurally reinforce the cell. It will be clear that these parts may be molded, if desired, as a single, integral piece.

The opaquing material 16 and the explosive charge 17 may be operatively disposed with respect to the chamber 15 by providing an elongate member 19 with a groove extending substantially the length thereof which forms a reservoir 20 for containing the opaquing material 16 and the explosive charge 17. The elongate member 19 may fit between the lenses 11 and 12 and abut the ends of the spacer 13 so as to fully enclose the chamber or void 15 and act as an additional spacer between the lenses. The elongate member 19 may be secured to the lenses in any suitable manner, for example, bonded or bolted like spacer 13.

The reservoir or groove 20, which preferably extends along the greatest length of the void 15 may be of any suitable depth and width depending upon the type of opaquing material to be used and the area and configuration of the lenses to be covered. Also it may be preferred to provide the innermost portion of the reservoir with a suitable rounded radius 21 (FIG. 2), the purpose of which will be described below.

It has been determined that the eye damaging visible and near visible electromagnetic radiation emitted from a nuclear explosion reach peak intensities in about one-half millisecond after the detonation, and in order to prevent eye damage to personnel exposed to such radiation an optical density of at least three, i.e., one-thousandth of the light intensity, should be provided within about a maximum time of two hundred microseconds after reception of an appropriate signal indicating the beginning of a detonation. Thus in order to provide a suitable optical density over the entire transparent area of the cell within the time limit, an opaquing material possessing certain qualities should be used; for example, such material should be readily dispensable in any environment and provide a "clinging" coat or cover of opaquing material over the entire inner surfaces of the lenses subjected to light transmission so as to achieve optimum optical density within the time limit while maintaining such optical density or a greater density for relatively long periods of time. While few opaquing materials satisfy the above requirements, good results have been obtained by using plain or colloidal (fine particle) suspensions of graphite or molybdenum disulfide in liquid carriers such as normal hexyl alcohol, isopropyl alcohol or an alkyd resin solution. Particle size, percent of solid content and consistency of the opaquing dispersion may each be varied to attain the best coverage. For example, a colloidal suspension of graphite in an isopropyl alcohol or normal hexyl alcohol carrier having a solid content of about twenty percent with the graphite particles being of relative fineness and having a paste-like consistency provides very good and uniform lens coverage.

Oftentimes the opaquing dispersions may be subjected to wide variations of temperature, thus it is important when they are in such environments to use dispersions having relatively high boiling points and low freezing points. The graphite-isopropyl alcohol dispersion, for example, boils at about 82° C. and freezes at about −89° C., which temperature limits are well beyond the temperature range to which the dispersions are normally exposed.

With the device illustrated in FIG. 1 it may be desirable to use a mild detonating fuse material (MDF) to expel the dispersion from the reservoir, but any suitable fuse material may be used; such materials are commercially available. The MDF 17 preferably extends at least the full length of the reservoir 20 and may be bonded or otherwise held adjacent the rounded radius 21 so as to facilitate uniform expulsion of the opaquing dispersion. Normally the MDF 17 comprises a core of explosive material encased in a sheath of a suitable metal, such as lead or aluminum, or in a suitable woven fabric, which helps to prevent the dispersion and other possible contaminants from adversely affecting the explosive material. The explosive material should have a fairly rapid detonating velocity, so as to facilitate providing a substantially continuous curtain of opaquing material across the lens-cell. For example, MFD with pentaerythritol tetranitrate (PETN) as the explosive material or driver is highly satisfactory and has a fast detonating velocity; for instance, an MDF with one-grain-per-foot of PETN has a detonating velocity of six and seven-tenths millimeters per microsecond. Another MDF which performs satisfactorily uses an explosive driver of cyclotrimethylene trinitramine (RDX). The two explosive drivers for the MDF mentioned above are only examples of suitable types; thus it will appear clear that other explosive drivers and protective sheaths may be used where different detonating velocities and brisance are desired.

Some MDF may be detonated by means as simple as an exploding bridge wire, but with PETN or RDX there is preferably employed explosive means, such as, for example, a squib assembly 22 having an exploding bridge wire actuator 23 and a chemical load 24 of seventy percent lead azide and thirty percent lead styphnate.

An add reliability to the MDF detonating means it may be desirable to place a squib assembly 22 at each end of the MDF, then if one fails in its intended function the other will detonate the MDF and effect the lens coverage or closure within the maximum time limit. By using two MDF detonators the possibility of both failing is highly unlikely, thus providing a very reliable MDF detonating system.

The elongate member 19, which may be of the same material as the spacer 13, may be provided with a throughgoing aperture 26 at each end which may communicate with the reservoir or groove 20 adjacent the innermost or "bottom" portion thereof. A suitable length of MDF 17 may then be placed in the reservoir with each end thereof passing through an perture 26 to a point where a suitable MDF detonating means, such as squib 22, may be attached.

After the MDF is in place the opaquing dispersion 16 of the selected type may be placed in the reservoir 20 so as to fill the latter. A barrier 27 may then be placed over the reservoir opening and be secured to member 19 in any suitable manner, such as, for example, "clamping" it between the lenses 11 and 12 and the member 19, so as to retain the opaquing dispersion in place. A suitable barrier may comprise a very thin layer, i.e., less than three-thousandths inch of plastic such as Mylar (polyethylene-terephthalate) or of metal such as aluminum. Mylar is normally preferred but tends to be unsuitable where the device may be in storage in extreme temperature environments. Thus a metal barrier, e.g., aluminum or the like, which may be readily attached to a suitable surface on the member 19, may be preferred in such environments even though it takes about twenty microseconds longer to effect lens coverage or closure.

In the operation of the device in FIGS. 1 and 2, a suitable signal indicating the presence of an intense flash automatically heats or explodes the bridge wires 23 in the squibs 22 causing the detonation of the MDF 17 which, in turn, projects the opaquing suspension through the barrier 27 and into the lens-cell or void 15 in the form of a substantially uniform opaque curtain which "clings" to the inner walls of the lenses 11 and 12 and provides an optical density of three or more within a maximum time of two hundred microseconds.

Figure 3:
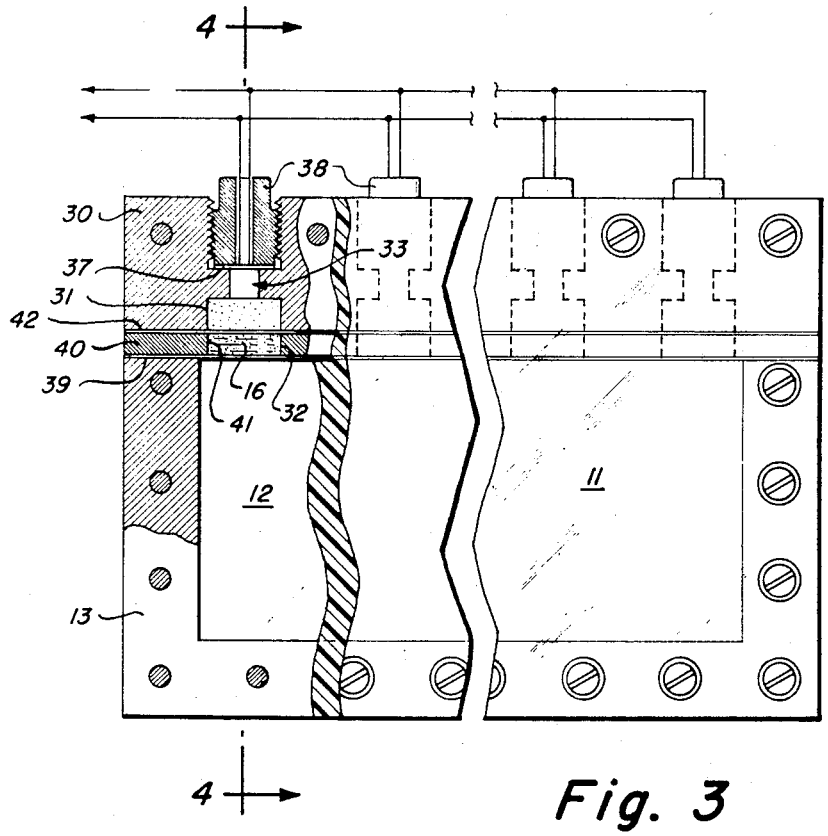
FIG. 3 is a schematic elevational view, partly cut away, showing a modified form of the preferred embodiment in which a different arrangement of the explosive and the opaquing material is used.
Figure 4:
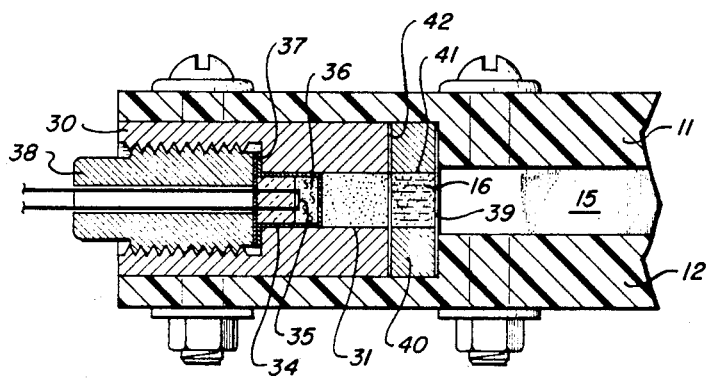
FIG. 4 is a sectional view taken along line 4—4 of FIG. 3.

The embodiment illustrated in FIGS. 3 and 4 may utilize the same lens and spacer arrangement as the device in FIG. 1. This embodiment, however, uses another groove and explosive arrangement. The elongate member 30 which may be secured to the lenses 11 and 12 in the same manner as member 19, may be provided with a plurality of through-going apertures or pockets 31 (four shown) which extend through the member 30 and communicate with the chamber or void 15 between the lenses 11 and 12. The innermost portion of each aperture 31 may be of generally oval shape and be used as an opaquing material groove or reservoir 32.

A suitable explosive means 33, such as, for example, a squib 34 having a bridge wire 35 and a chemical load 36 similar to squib 22 (FIG. 1) and including a flange 37 at the upper end thereof may be inserted into each aperture 31 to a point adjacent each reservoir 32 where the aperture 31 may be reduced in diameter to centrally position each squib 33. The squib 34 may be secured in place within the reduced diameter portion of the aperture 31 by providing a sealing retainer 38 which may threadedly engage the member 30 and be "screwed" into the aperture 31 to where it binds the squib flange 37 against the reduced diameter portion of the aperture.

An opaquing dispersion, which may be of the same type used in the device of FIG. 1, may be placed in each reservoir 32 and sealed therein by providing a barrier 39, which may be plastic or metal, like barrier 27 (FIG. 1), on each side or opening to each reservoir 22.

This arrangement provides for the actuation of a plurality of separate detonators or squibs 34 which may be connected in common to the same initiating means and which, in turn, effect the projection of a plurality of separate clouds of the opaquing dispersion into the chamber or void 15 to "cling" to the inner walls of the lenses 11 and 12 and effectively attain a uniform optical density of three or better within the maximum time limit of two hundred microseconds.

It has been found that by dividing each reservoir 32 into a pair of independent reservoirs with a barrier therebetween and then by placing another opaquing material, for example, small dry or other carbon particles, in the uppermost reservoir adjacent the squib a more nearly optimum coverage of the lenses results. It may be desirable to form the independent reservoir by providing a member 40, which may be secured to an innermost portion of the member 30 and be substantially the same length thereas, with a plurality of oval bores 41 each aligning with the oval portion of an aperture 31. To separate the two reservoirs a barrier 42 may be conveniently placed and secured between the members 30 and 40. With such an arrangement each charge of the opaquing dispersion is contained between two barriers 39 and 42 in the lower reservoir while the additional opaquing material is contained between the upper barrier 42 and the squib 34. The upper reservoir also serves as an expansion chamber for each squib 34 and contributes toward near uniform distribution of the opaquing medium.

Any suitable number of reservoirs may be used with this embodiment depending, of course, upon the lens-cell shape, extent of cell coverage desired and the time limit within which such coverage should be attained.

Figure 5:
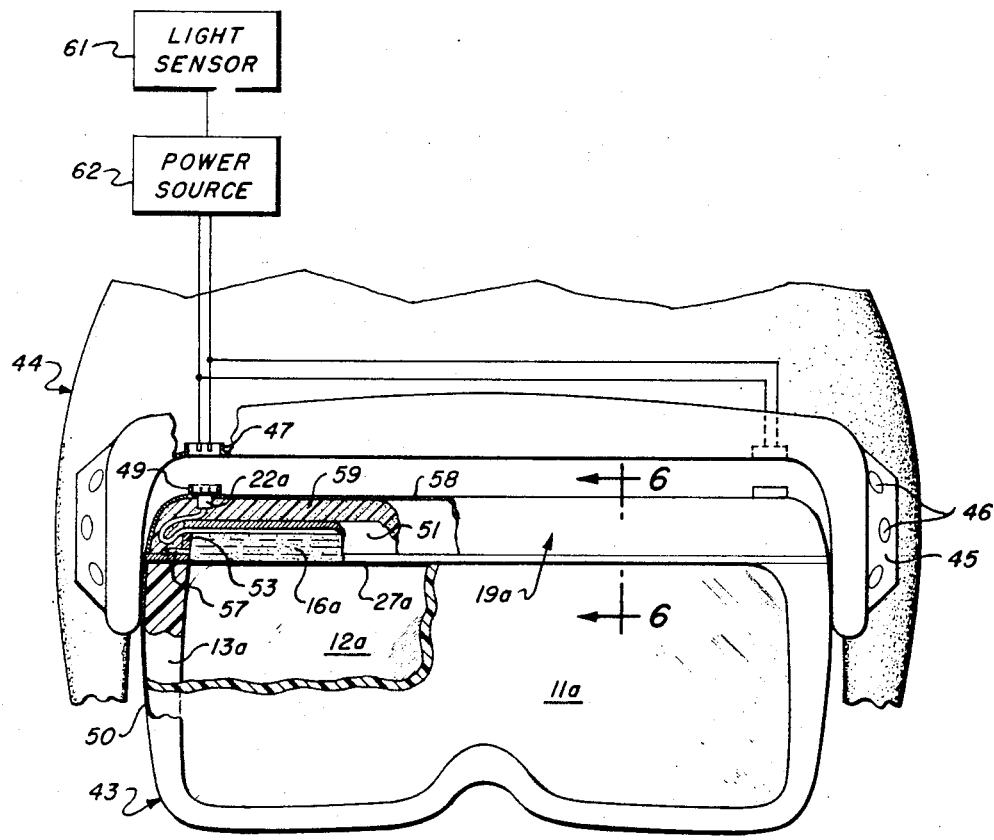
FIG. 5 is a view, partly cut away, showing the general lens-cell arrangement of a pair of goggles or protective spectacle configuration containing an explosive actuated opaquing system and a block diagram of a typical explosive actuating circuit.
Figure 6:
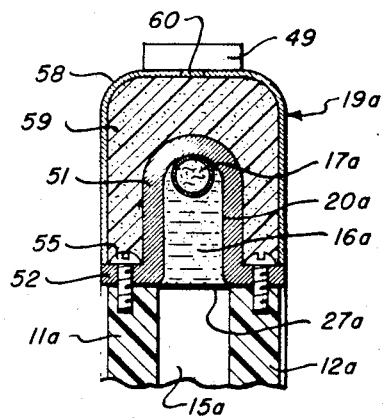
FIG. 6 is a sectional view taken along line 6—6 of FIG. 5.

In FIGS. 5 and 6 a typical configuration of a pair of goggles or protective spectacles is illustrated associated with an antiflash device in accordance with the present invention. Goggles, such as used by aircraft pilots and the like, may be attached to a protective headgear or else worn by such personnel in any other suitable fashion, but for convenience of description the goggles will be described with reference to an associated headgear. The goggles, generally indicated at 43, may comprise, for example, an arrangement similar to the one illustrated in FIG. 1, of course, modified to conform to an appropriate shape. Thus, the numerals used to indicate various components of the device in FIG. 1 will be used along with the suffix $a$ to indicate similar components in FIGS. 5 and 6.

A headgear, generally indicated at 44, may be provided with a bracket 45 which may be secured to the headgear 44 over a portion adjacent the wearer's forehead in any suitable manner, such as by bolts 46 or the like. The bracket 45 may be shaped to receive the uppermost portion of the goggles 43 in a light-sealing manner and be provided with a pair of electrical connector portions 47 (one of which is shown) which are adapted to engage mating connector portion 49 on the top of the goggles, thus coupling the circuit from the squibs 22a to the bracket 45.

While the headgear 44 and the goggles are normally tightly secured together (shown slightly separated for convenience of illustration), it may be desirable to provide the bracket 45 and the frame on the goggles, which may be the spacer 13a or member 19a, with suitable releasable attaching means (not shown) so as to permit a pair of actuated and opaqued goggles to be readily removed and replaced with a non-actuated pair.

When using the goggles of the present invention with a headgear or the like it may be desirable to fabricate the goggles by using a more suitable and lighter construction than that shown in FIGS. 1–4. In this arrangement the lenses 11a and 12a are separated from each other by a plastic spacer 13a which may be bonded to the lenses in any suitable manner. A generally U-shaped clip-like metal shell 50 which conforms to the marginal shape of the goggles may then be placed in a "clamping" manner over the peripheral edges and sides of the lenses to hold the lenses tightly against the spacer 13a. It may be desirable to secure the metal shell 50 and the lenses by a suitable metal-to-plastic bonding agent.

The elongate member 19a may be formed in part by providing a relatively thick metal shell 51 having a depression therein in the desired shape of the opaquing material groove or reservoir 20a and an encircling flange 52 which is of substantially the same width as either lens 11a or 12a and which extends substantially the full length of the goggles. The shell 51 should have sufficient mechanical strength and mass so as to withstand the strain imposed upon the shell walls by the detonation of the MDF. The reservoir depression in the shell 51 may be provided with end walls 53 adjacent each end thereof which communicate with the flange 52 to enclose the reservoir ends. The MDF 17a may be placed and secured in the shell depression in the same manner as described above for the device in FIGS. 1 and 2 with each end of the MDF passing through suitable openings in the end walls 53. After placing the MDF a barrier 27a such as Mylar which extends substantially the full width and length of the goggles may be placed between the flange 52 and the exposed ends of the lenses 11a and 12a. Bolts or the like 55 may then be passed through the flange 52 and the barrier 27a into suitable threaded receiving holes in the lenses to rigidly secure the shell 51 to the lenses and enclose the chamber 15a. The barrier 27a which is held tightly between the shell flange 52 and the lenses, closes and seals the reservoir 20a while also acting as a seal in the joint between the shell 51 and the lenses.

It has been found that by placing the opaquing material 16a in the reservoir after the shell 51 is secured to the lenses the possibility of air bubbles and unfilled spaces remaining in the reservoir is minimized. To fill the reservoir at such time, a small fill tube 57 may be provided in each reservoir end wall 53 (only one tube 57 shown). Thus as the opaquing material is introduced into the reservoir through one tube 57 the other tube 57 acts as a vent as to allow complete filling. The tubes may be sealed after the filling in any suitable manner such as "pinching" the ends.

The remaining portion of the elongate member 19a may comprise a further metal shell 58 which is enclosed at its ends so that when placed over the reservoir forming shell 51 the edge of shell 58 engages the peripheral edge of the flange 52. The shell 58 may be fastened to the flange or the lenses in any suitable manner.

After the shell 58 is in place a suitable material such as some foam plastic, rigid or otherwise, for example, foamed polystyrene or polyurethane, may be poured in a liquid state through suitable openings 60 in the shell 58 into the empty space between the shells 51 and 58 to fill the space. The nature of the material 59 may be such that when it is cured it acts as a bonding medium between the shells 51 and 58 to secure the shell 58 to the goggles. The plastic filler aids to structurally reinforce the goggles; however, if desired, the space between the shells may be left empty.

While the fill material between the shells 51 and 58 may normally comprise foamed plastic it will appear clear that other materials such as high density metal, for example, lead alloy, may be used. When using the metal filler the shell 51 need not be as thick as when using a plastic fill. Also, if desired, the metal or plastic filler may be preformed and placed over the shell 51 before attaching the outer shell 58.

To effect the operation of any or all of the devices shown a suitable light-sensing circuit may be used which may comprise, for example, a light sensor 61 of solid state photo-sensitive material such as a selenium or silicon diode, which is capable of producing current upon reception of light. The light sensor 61 may be coupled to a power source 62, e.g., a charged capacitor, which in turn is coupled to the squibs 22a through suitable circuitry in the bracket 45 and the connector portions 47 and 49. Thus when light of sufficient intensity, such as emitted from a nuclear detonation, is sensed by the photocell 61 the latter automatically triggers the capacitor 62 and explodes the bridge wires 23a to actuate the squib 22a and the MDF 17a to expel the dispersion 16a into the lens-cell or chamber 15a to quickly cover the lenses with a layer of the dispersion.

While each of the above embodiments of the present invention shows the explosive actuated opaquing material on only one side of the lenses it will be clear that the explosive actuated opaquing material may be placed completely around the lenses or on any desirable portion thereof. Also the chamber or void 15 between the lenses 11 and 12 may be evacuated to provide a slight time saving in lens-cell coverage.

It will be seen that the present invention provides a highly reliable and effective means capable of covering the lenses of goggles or the like with opaque material which attains a desired optical density well within the maximum permissible time and which continues to increase in density so that at the peak of the flash intensity the optical density is much greater than the initially desired density, thus affording added protection. While the present invention is primary directed to eyesight protection, it will appear clear that the present invention may be used for other purposes, such as, for example, providing a fast shutter device for cameras which permits the latter to photograph an initial portion of a flash producing event and yet provide the camera lens with protective cover before the flash reaches intensities sufficient to ruin the film.

Also such a fast shutter may be used to prevent "rewrite" on a high speed rotary camera.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

We claim:

1. A device of the character described comprising in combination a pair of light-transmitting members, means fixedly secured to said members for spacing the latter apart from each other and for forming with said members a normally light-transmitting chamber, said means fixedly secured to said members being provided with groove means communicating with said chamber, an opaquing medium normally disposed in said groove means, retaining means intermediate the opaquing medium and said chamber for normally maintaining said opaquing medium in said groove means and apart from said chamber, explosive means disposed in close proximately to said groove means and said opaquing medium for forcibly ejecting the opaquing medium through the retaining means and into the chamber to effect the dispersal of the opaquing medium throughout said chamber and therby rendering the latter essentially impervious to the transmission of light.

2. A device of the character described comprising in combination a pair of light-transmitting members, means fixedly secured to said members for spacing the latter apart from each other and for forming with said members a normally light-transmitting chamber, an opaquing medium normally disposed adjacent to a peripheral portion of said chamber, retaining means intermediate the opaquing medium and said chamber for normally maintaining said opaquing medium apart from said chamber, a length of fuse material extending along substantially the length of an edge of said chamber and initiating means coupled to the fuse material for actuating the later to forcibly eject the opaquing medium through the retaining means and into the chamber to effect the dispersal of the opaquing medium throughout said chamber and thereby rendering the latter essentially impervious to the transmission of light.

3. The device claimed in claim 2 wherein said opaquing medium comprises opaque particles in a liquid carrier, and wherein said retaining means comprises a barrier for retaining said liquid carrier with opaque particles adjacent to and extending along said fuse material.

4. A device of the character described comprising in combination a pair of light-transmitting members, means fixedly secured to said members for spacing the latter apart from each other for forming with said members a normally light-transmitting chamber, said means secured to said members including a plurality of separate pockets spaced apart from each other along an edge of said chamber, an opaquing medium normally disposed adjacent to a peripheral portion of said chamber, retaining means intermediate the opaquing medium and said chamber for normally maintaining said opaquing medium apart from said chamber, and explosive means disposed in close proximity to the pockets comprising a plurality of detonators each communicating with one of said pockets for forcibly ejecting the opaquing medium through the retaining means and into the chamber to effect the dispersal of the opaquing medium throughout said chamber and thereby rendering the latter essentially imprevious to the transmission of light.

5. The device claimed in claim 4 wherein each of said pockets extends through said means secured to said members, said opaquing medium comprises a suspension of opaque particles in a liquid carrier contained in each of said pockets adjacent to the chamber by the retaining means, and wherein each of said detonators extends into one of said pockets and terminates adjacent to said retaining means.

6. The device claimed in claim 5 wherein each of said pockets is divided into a pair of separate spaces one of which contains the opaquing medium, said retaining means comprises a pair of barriers each disposed on an opposite side of the opaquing medium for maintaining the latter within said one space, and wherein the other space is adjacent each detonator and form an expansion chamber therefor.

7. The device claimed in claim 6 wherein each of said detonators is coupled to a common actuator circuit, and wherein each said other space contains another opaquing material.

References Cited

UNITED STATES PATENTS

| | | | |
|---|---|---|---|
| 886,684 | 5/1908 | Dukelow | 88—57 |
| 2,397,009 | 3/1946 | Hurley et al. | 88—41 |
| 2,437,642 | 3/1948 | Hentroeau | 88—41 |
| 2,632,045 | 3/1953 | Sziklai | 88—57 |
| 2,710,274 | 6/1955 | Kuehl | 88—57 |
| 2,995,935 | 8/1961 | Eyestone et al. | |

JEWELL H. PEDERSEN, *Primary Examiner.*

A. M. HORTON, *Examiner.*

L. L. HALLACHER, *Assistant Examiner.*